United States Patent [19]

Zajac et al.

[11] Patent Number: 4,892,378
[45] Date of Patent: Jan. 9, 1990

[54] PROCESS FOR MOUNTING AN OPTICAL FIBER IN AN OPTICAL-FIBER CONNECTOR ELEMENT, AND A CONNECTOR ELEMENT FOR CARRYING OUT THE PROCESS

[75] Inventors: Elie Zajac; Gilbert Manoff, both of Gagny, France

[73] Assignee: Radiall, Rosny Sous Bois, France

[21] Appl. No.: 196,045

[22] Filed: May 19, 1988

[30] Foreign Application Priority Data

May 21, 1987 [FR] France ................. 87 07138

[51] Int. Cl.⁴ ................. G02B 6/36; G02B 7/26
[52] U.S. Cl. ................. 350/96.20; 350/96.21
[58] Field of Search ................. 350/96.20, 96.21

[56] References Cited

U.S. PATENT DOCUMENTS 4,389,091 6/1983 Lidholt et al. ................. 350/96.20
4,684,205 8/1987 Margolin et al. ................. 350/96.20
4,737,009 4/1988 Kakii et al. ................. 350/96.20

Primary Examiner—William L. Sikes
Assistant Examiner—Robert E. Wise
Attorney, Agent, or Firm—Schweitzer & Cornman

[57] ABSTRACT

The invention relates to a process for mounting an optical fiber, in a connector element comprising a body having a frontal end surface which defines a plane of reference, and comprising a ferrule accommodated in said body, projecting axially toward the front and having a frontal end face which is located at a predetermined axial distance from said plane of reference.

After the end of an optical fiber is stripped, it is mounted from the rear so that it projects axially from the frontal end (8a) of the ferrule (8); the non-stripped part of the optical fiber is immobilized at the rear of the body; the axial relative position of the stripped part of the fiber with respect to the frontal face of the ferrule is modified by a mechanical constraint exerted on either the fiber or the ferrule, by means of an appropriate tool positioned in a precise manner with respect to the plane of reference; a scratch is made in or in front of the plane of the frontal face of the ferrule; the fiber is fractured at the location of the scratch; and the fiber or the ferrule is allowed to return elastically.

8 Claims, 4 Drawing Sheets

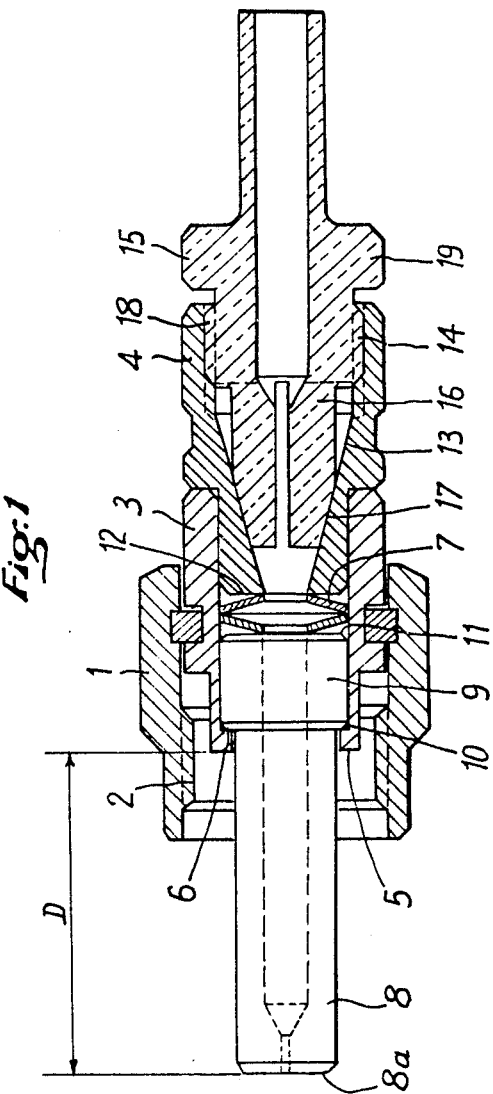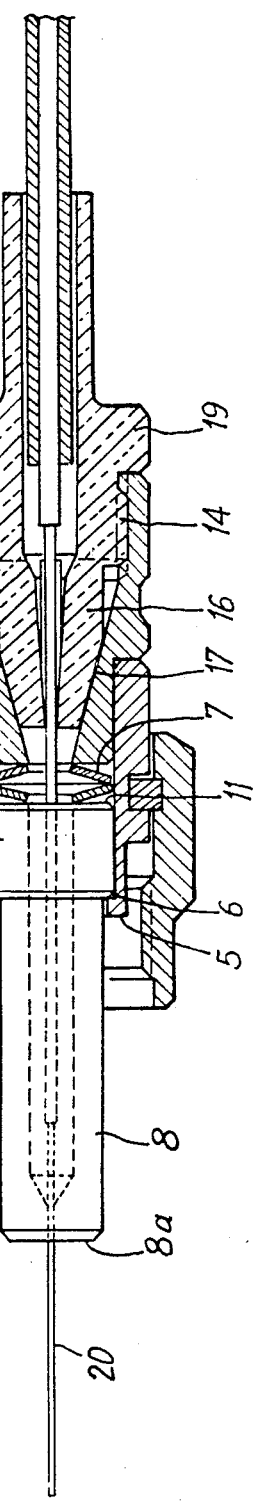

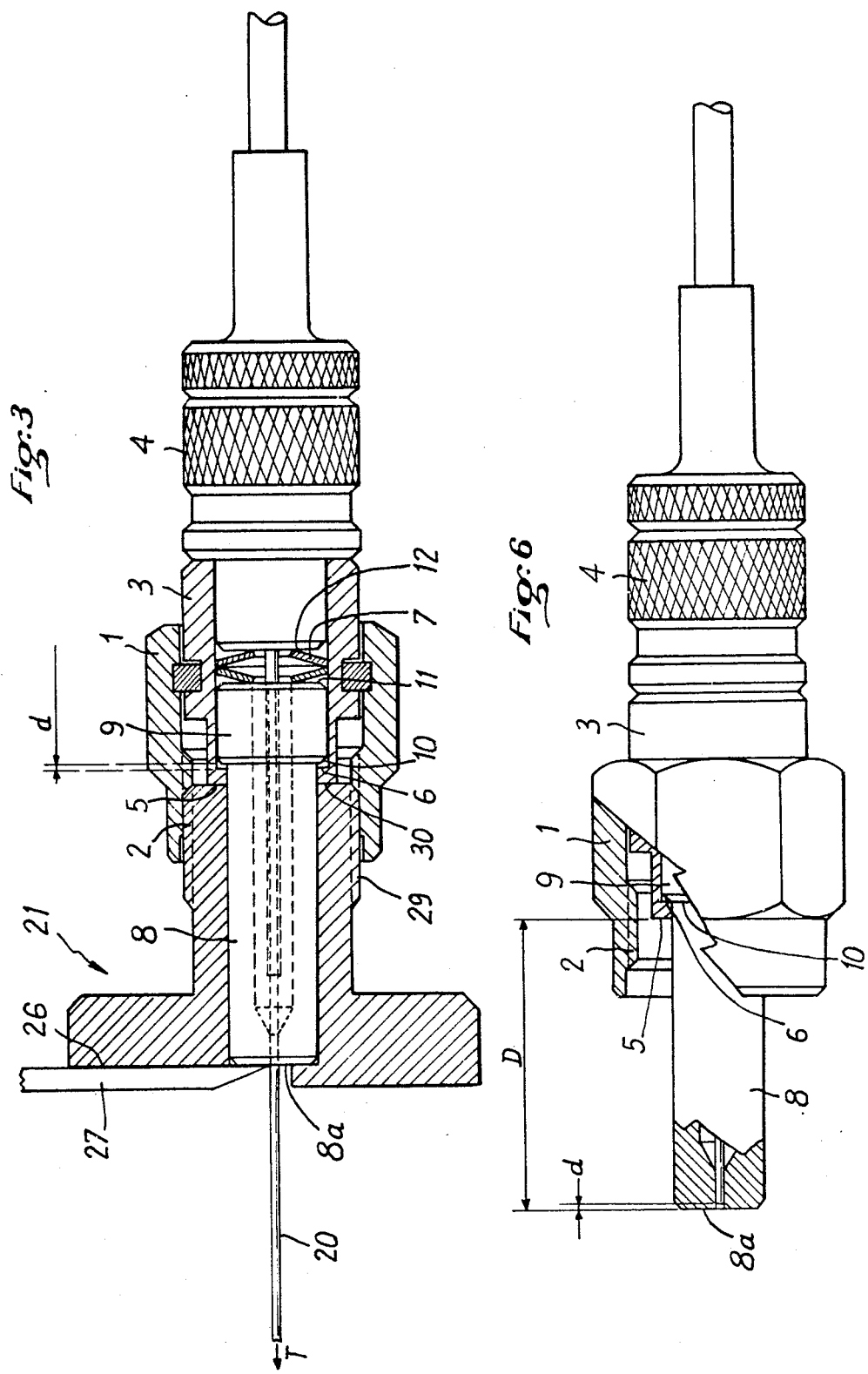

PROCESS FOR MOUNTING AN OPTICAL FIBER IN AN OPTICAL-FIBER CONNECTOR ELEMENT, AND A CONNECTOR ELEMENT FOR CARRYING OUT THE PROCESSu

BACKGROUND AND SUMMARY OF THE INVENTION

The present invention relates to a process for mounting an optical fiber in a connector element, and more precisely, a connector element of the type intended to be assembled in a joining element, opposite an identical connector element, to provide for the connection of two immobilized optical fibers, each in one of the connector elements.

The connector element for carrying out the process according to the invention is of the type comprising a peripheral joining nut; a body, whose front end surface defines a reference plane, provided at its rear end with means to retain an optical fiber introduced into the rear end of said body; a ferrule in which the stripped end of the optical fiber can be positioned, which is accommodated in said body and projects axially toward the front of the same, the front end face of said ferrule being located at a predetermined axial distance from said plane of reference.

In such connector elements, the reference distance, that is the above-mentioned distance between the front face of the ferrule and the plane of reference defined by the front end surface of the body, must be observed with precision, because it is standardized.

The stripped end of the optical fiber must either be located in the plane of the end face of the ferrule, or preferably be recessed by a predetermined distance, for example 20 microns, with respect to this end surface.

The technique currently utilized, to assure coincidence between the stripped end of the optical fiber and the end face of the ferrule of the connector element, consists of adhering the stripped fiber in the axial hole of the ferrule, into which it is introduced from the rear, and from which it projects axially toward the front; and in eliminating the projecting portion of the fiber by polishing, by means of an appropriate gauge.

This technique is not suitable when it is desired to maintain the stripped end of the fiber recessed by a certain distance from the front face of the end of the ferrule.

The applicant company has described, in its European Patent 0011561, a process for immobilizing an optical fiber in a connector ferrule with a slight recess with respect to the end, by breaking the optical fiber, which is carried out by making a scratch with an appropriate tool on the stripped end of the fiber, recessed from the end of the ferrule, and then applying axial traction to the fiber to divide it.

The technique described in this European patent is suitable for fibers comprising a casing or cladding that is relatively soft, insofar as it requires a slight compression of the casing, but is not directly usable for fibers having a hard casing.

This known technique, of dividing fibers by breaking them, is furthermore difficult to carry out in practice, because of the difficulty of precisely controlling the placement and depth of the scratch on the fiber, because of the substantial dimensions of the tool with respect to the dimensions of the ferrule and of the fiber.

The present invention is intended to provide a process by which an optical fiber can be mounted in a connector element, in such a way that its end is recessed by a predetermined distance from the end face of the ferrule, or in the plane of this end face, and in a particularly simple, rapid, and reliable manner.

The method according to the invention is characterized by the fact that after the end of an optical fiber has been stripped, the fiber is inserted from the rear in the connector element, in such a manner that it projects axially from the front end of the ferrule; the non-stripped end of the optical fiber is immobilized at the rear of the connector body; the axial position of the stripped part of the fiber, relative to the front face of the ferrule, is modified by a mechanical force applied to either the fiber or the ferrule; with the aid of an appropriate tool, positioned in a precise manner with respect to the plane of reference, a scratch is made in or in front of the plane of the front face of the ferrule; the fiber 10 is broken at the position of the scratch; and the fiber or the ferrule is allowed to return, or is elastically restored, to its initial position.

According to a first embodiment of the invention, using a connector element in which the ferrule is axially movable with respect to the body, against an elastic return member accommodated in the body, a gauge is engaged on the ferrule, preferably by turning the peripheral joining nut; the gauge having a central bore whose diameter corresponds to the exterior diameter of the ferrule; the gauge comprising a first end surface intended to come into contact against the surface of the connector element body which defines the plane of reference, and a second end surface, which is remote from the first surface by a distance which is less, by a predetermined value, than the distance on the connector element between the frontal face of the ferrule and the plane of reference; such that when the gauge is engaged, the ferrule is pushed back with respect to the body by said predetermined difference value; in this position, a scratch is produced on the fiber projecting from the gauge, along the second end surface thereof, by means of an appropriate tool; an axial traction is exerted on the fiber to break it at the position of this scratch; after which said gauge is withdrawn, the ferrule returning to its initial position under the action of the elastic support member, the end of the optical fiber then being recessed from the end of the ferrule by a distance corresponding to the predetermined difference value.

The connector element is then ready for use and it is only necessary to mount it in a corresponding joining element.

The connector element for carrying out this first embodiment is advantageously characterized by the fact that the ferrule has at its rear end an annular flange of greater diameter, whose frontal face is able to come into contact against an abutment surface formed by a hooked portion of the bore of the connector element body, under the action of an elastic member accommodated in the body, which is constituted, for example, by spring washers in axial contact against the rear face of said flange.

A second embodiment of the process according to the invention, which can be carried out with conventional connector elements in which the ferrule is fixed with respect to the body, is characterized by the fact that relative axial displacement of the stripped part of the fiber with respect to the frontal face of the ferrule can be obtained by exerting traction at the stripped end of the fiber so as to cause an elastic elongation thereof; and then breaking it by means of an appropriate tool, with respect to which the connector element has been precisely positioned; after which the fiber is allowed to return by its own elasticity into the ferrule, the end of the fiber then being located either in the plane of the frontal face of the ferrule, or recessed by a predetermined distance with respect to the plane. The final position of the fiber in the ferrule is determined by adjusting the axial traction force exerted on the end of the fiber, and the distance of the tool with respect to the reference plane of the connector element, as a function of the mechanical characteristics of the fiber, particularly its modulus of elasticity, and as a function of its diameter.

In these two embodiments, the optical fiber can be immobilized by its non-stripped part at the rear of the connector body by any appropriate means, for example by adhesion or mechanical clamping; for example by gripping it with a lock member comprising a split tubular clamping part with a tapered exterior surface, which cooperates with the surface of a tapered bore provided in the rear part of the body. Other advantages and characteristics of the invention will be apparent from reading the following description of an embodiment thereof, with reference to the accompanying drawings, in which:

DESCRIPTION OF THE DRAWINGS

FIG. 1 is a sectional view illustrating a connector element for carrying out a first embodiment of the invention, before mounting of an optical fiber, FIG. 2 illustrates the connector element after mounting of the optical fiber, FIG. 3 illustrates the succeeding step of breaking the fiber by means of a gauge, FIG. 6 illustrates the connector element in its finished condition.

DETAILED DESCRIPTION OF THE INVENTION

Figure 4:
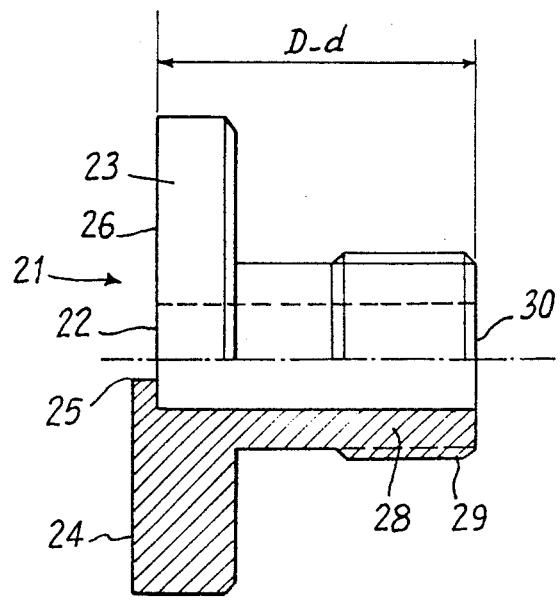
FIG. 4 is an elevational view, partly in section, of the gauge utilized in FIG. 3.

In the embodiment of FIGS. 1-6, the connector element comprises a peripheral nut 1 provided with a thread 2 for being screwed into a joining element (not shown) in which the connector element is to be mounted after preparation, in order to interconnect optical fibers.

The nut 1 is mounted on a body constituted of two parts 3 and 4, which are firmly engaged with each other.

The front part of the body terminates in a frontal face 5 constituting the reference surface of the connector element. In the interior of the bore of the part 3 of the body, there is provided, by a hooked portion, an interior abutment surface 6. Elastic washers 7 are further more accommodated in the bore of the part 3 of the body.

In this front part 3 of the body is disposed a ferrule 8 extending axially from the frontal face 5 of the body and from the peripheral nut 1, the ferrule comprising in its rear part a flange 9.

The ferrule is accommodated in the body so as to be in contact, by the frontal face 10 of its flange 9, against the abutment surface 6, the rear face 11 of the flange 9 being in contact with the elastic washers.

The rear part 4 of the body of the connector element comprises a frontal face 12 providing the rear contact surface for the elastic washers 7. The part 4 comprises an interior bore providing a tapered region 13 converging toward the front, which is extended toward the rear by a tapped cylindrical region 14.

To provide locking of the optical fiber, the connector element according to the invention comprises a rear locking member 15 having a front clamping part 16 provided with an exterior tapered surface 17 and longitudinal slits, for example four or six in number, permitting an elastic radial pinching effect to be exerted on an optical fiber introduced into the center, when the locking member 15 is screwed by a threaded region 18 into the tapped region 14 until its flange 19 comes into contact against the rear face of the part 4 of the body; that is, when the rear locking member is displaced between the positions illustration in FIGS. 1 and 2.

As seen in FIG. 1, the construction provides a predetermined distance D between the end face 8a of the ferrule 8 and the reference plane defined by the end face 5 of the part 3 of the body.

In the position of the connector element in FIG. 1, an optical fiber is introduced from the rear, so that its stripped end 20 projects substantially beyond the frontal end face 8a of the ferrule 8. In this position, the rear locking member 15 is turned so as to lock the fiber, at the position of the elastic clamping part 16 of the locking member, the fiber being locked at a non-stripped portion thereof.

Figure 5:
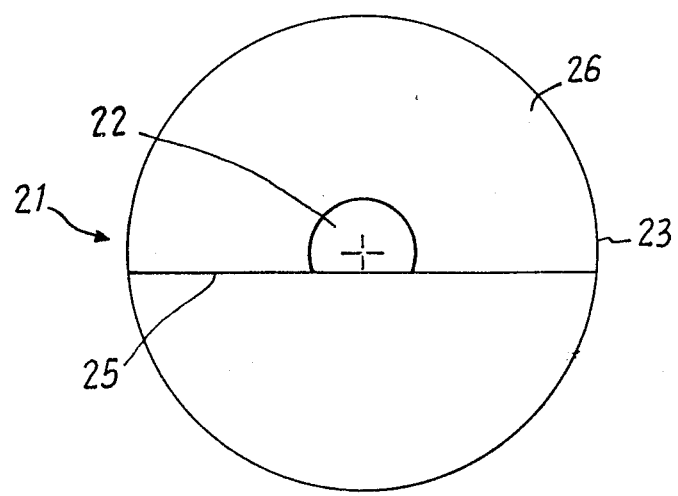
FIG. 5 is an end view of the gauge.

Then the fiber is broken, as illustrated in FIG. 3, by mounting a gauge as illustrated in FIGS. 4 and 5.

This gauge, indicated generally by 21, comprises a central bore 22, having a diameter corresponding to the exterior diameter of the ferrule 8, so as to permit a free engagement of the gauge on the ferrule. The gauge comprises at one end a large diameter flange 23 having a hooked portion 24, the plane 25 thereof being located transversely to the bore 22, and below the axis thereof. The end surface 26 of the flange 23 constitutes a guide surface for a tool, such as an aluminum cutting tip 27, illustrated in FIG. 3, which is intended to provide an incipient fracture, in the form of a scratch, on the projecting end of the stripped part 20 of the optical fiber.

The gauge 21 comprises at its other end a flange 28 provided with a thread 29 adapted to cooperate with the thread 2 of the peripheral nut 1 of the connector element.

The end surface 30 of the flange 28 is constructed to be at a predetermined distance (D−d) from the surface 26, (d) being the desired distance on the finished connector element between the end of the optical fiber and the end face 8a of the ferrule, the distance D having been previously defined.

As illustrated in FIG. 3, the gauge 21 is engaged in the peripheral nut 1 around the ferrule 8 by turning the cooperating threads 2 and 29, until its surface 30 comes into contact against the surface 5 of the part 3 of the body forming the reference surface.

The ferrule 8, during this screwing step, is pushed back against the elastic effect of the washers 7; a distance (d), for example 20 microns, then existing between the surface 10 of the flange 9 of the ferrule, and the abutment surface 6 of the bore of the part 3 of the connector element body.

Then, by means of the tool 27, a scratch is made on the fiber by guiding the tool along the surface 26 of the gauge, at right angles with the end face 8a of the ferrule.

Then the projecting part of the fiber is eliminated by exerting an axial traction in the direction of the arrow T on the stripped end of the fiber.

Then it is only necessary to withdraw the gauge, and under the elastic effect applied by the washers 7, the ferrule 8 returns to its initial position in which the surfaces 10 and 6 are in contact. In this position, the end face 8a of the ferrule is located at the predetermined distance D from the reference surface 5; and the end of the fiber, as seen in FIG. 6, is recessed by the predetermined distance (d) from the end face of the ferrule.

Figure 7:
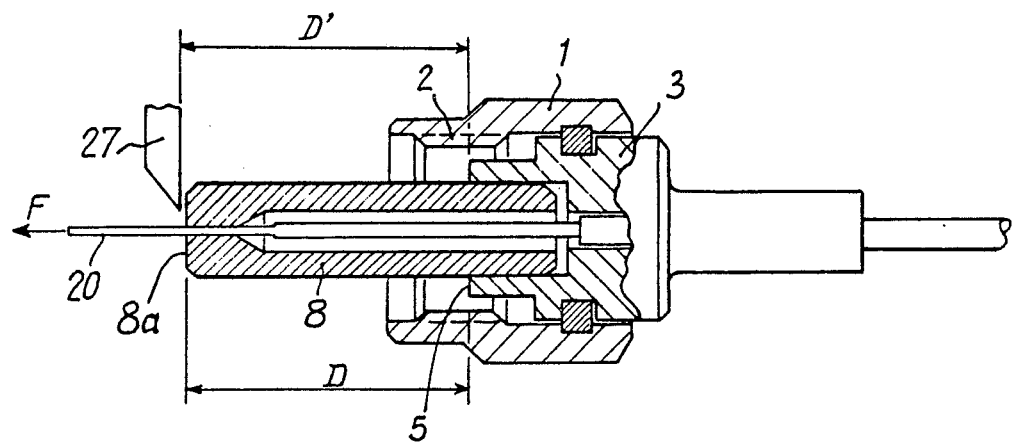
FIG. 7 is a sectional view illustrating a connector element for carrying out a second embodiment of the invention.
Figure 8:
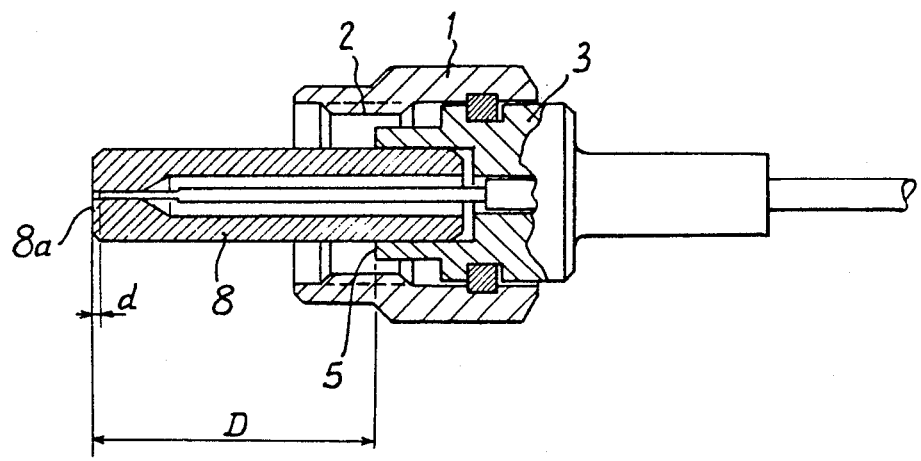
FIG. 8 is a view analogous to FIG. 7 showing the connector element in its finished condition.

In the embodiment illustrated in FIGS. 7 and 8, the connector element comprises a ferrule 8 fixed with respect to the part 3 of the body, such that the end face 8a of the ferrule is always located at the predetermined reference distance D from the end face of the body 3. To carry out the process according to the invention, the connector element is placed in an assembly jig, not shown, facing a tool 27, such that the cutting edge of the tool is located at a perfectly predetermined distance D' with respect to the reference surface 5 of the connector body.

In certain cases, this distance D' could be equal to D, but in practice, considering the mechanical characteristics of the fibers, this distance D' is slightly greater than D, such that the tool is located slightly in front of the frontal face 8a of the ferrule.

As illustrated by the arrow F in FIG. 7, a controlled axial traction is exerted by any appropriate means on the stripped end of the fiber 20, so a to cause an elastic elongation of the fiber, and the tool is actuated so as to make a scratch on the fiber, and, as a result of the applied traction, a cleavage thereof.

After being broken, the fiber returns elastically to its initial position, its broken end then being recessed by a predetermined distance (d) (FIG. 8) from the frontal face 8a of the ferrule, or if desired, in the plane of this end face of the ferrule. This position of the fiber is defined with precision in the final condition of the ferrule by adjusting the position of the tool and the traction force exerted on the fiber, as a function of the characteristics of the fiber.

This second embodiment is particularly interesting because of the savings in time that it achieves. Cabling can in fact be carried out in two to three minutes, as opposed to eight to ten minutes by the traditional adhering and polishing methods discussed above.

Although the invention has been described in connection with a particular embodiment thereof, it is clear that it is in no way limited thereby, and that different variations and modifications can be applied to the invention without departing from either the scope or the spirit thereof.

We claim:

1. Process of mounting an optical fiber in a connector element comprising a peripheral assembly nut; a body whose frontal end surface defines a reference plane, provided at its rear end with means for retaining an optical fiber introduced from the rear of said body; a ferrule in which the stripped end of the optical fiber may be positioned, which is accommodated in said body and projects axially therefrom toward the front, the frontal end face of said ferrule being located at a predetermined axial distance from said plane of reference; characterized by the fact that after the end of an optical fiber (20) has been stripped, it is mounted from the rear in the connector element so that it projects axially from the frontal end (8a) of the ferrule (8); the non-stripped part of the optical fiber is immobilized at the rear of the connector body; the axial position of the stripped part of the fiber relative to the frontal face of the ferrule is modified by a mechanical force applied to one of the fiber and the ferrule; by means of a scribing tool (27) positioned precisely with respect to the plane of reference, a scratch is made in predetermined relation to the plane of the frontal face of the ferrule; the fiber is broken at the position of the scratch; and one of the fiber and the ferrule is allowed to return elastically.

2. Process according to claim 1, using a connector element in which a ferrule is axially movable with respect to the body, against an elastic return member accommodated in the body, characterized by the fact that a gauge is engaged on the ferrule (8) preferably by turning the peripheral assembly nut (1), the gauge (21) having a central bore (22) whose diameter corresponds to the exterior diameter of the ferrule, the gauge comprising a first end surface (30) intended to come into contact against the surface (5) of the body of the connector element defining the plane of reference, and a second end surface (26), remote from the first surface by a distance (D-d), which is less than the reference distance (D) by a predetermined value (d), said reference distance (D) being defined on the connector element between the frontal face (8a) of the ferrule and the plane of reference (5) such that when the gauge is engaged, the ferrule is pushed back with respect to the body by said predetermined difference value (d); that in this position, a scratch is made on the fiber (20) extending from the gauge, along the second end surface (26) thereof, by means of a scribing (27); that an axial traction is exerted on the fiber to fracture the same at the position of the scratch; after which the gauge is withdrawn, the ferrule returning under the force of the elastic support member (71 to its initial position, the end of the optical fiber then being located recessed from the end (8) of the ferrule by a distance corresponding to said predetermined difference value (d).

3. Optical fiber connector element for carrying out the process according to claim 2, characterized by the fact that the ferrule (8) has at its rear end a large-diameter annular flange (9) whose frontal face (10) is able to be brought into contact against an abutment surface (6) formed by a hooked portion of the bore of the body (3, 4) of the connector element, under the action of elastic member (7) accommodated in the body in axial contact against the rear face (11) of said flange.

4. Connector element according to claim 3, characterized by the fact that said elastic member is constituted of elastic washers (7).

5. Connector element according to claim 3, characterized by the fact that it comprises a locking member engaged in the rear part (4) of the body of the connector element, to immobilize the non-stripped part of an optical fiber introduced into the rear of the connector element.

6. Connector element according to claim 5, characterized by the fact that the locking member comprises a slotted tubular clamping part (16) having a tapered exterior surface (17) cooperating with the surface (13) of a tubular bore provided in the rear part (4) of the body, the locking member and the rear part (4) of body comprising cooperating thread portions (14, 18).

7. Process according to claim 1, using a connector element in which the ferrule is fixed with respect to the body, characterized by the fact that an axial traction is exerted on the stripped end of the fiber (20) so as to cause an elastic elongation thereof, and after breaking by means of a scribing tool (27), with respect to which the connector element has been positioned precisely, the fiber is allowed to return by means of its own elasticity into the ferrule (8).

8. Process according to claim 1, characterized by the fact that the optical fiber is immobilized by mechanically clamping its non-stripped part at the rear of the connector body.

* * * * *